US010951798B2

(12) United States Patent
Ma et al.

(10) Patent No.: US 10,951,798 B2
(45) Date of Patent: Mar. 16, 2021

(54) HEAT DISSIPATING ARRANGEMENT FOR MINIATURIZED CAMERA DEVICE

(71) Applicants: TRIPLE WIN TECHNOLOGY(SHENZHEN) CO. LTD., Shenzhen (CN); HON HAI PRECISION INDUSTRY CO., LTD., New Taipei (TW)

(72) Inventors: Xiao-Mei Ma, Guangdong (CN); Shin-Wen Chen, New Taipei (TW); Sheng-Jie Ding, Guangdong (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 477 days.

(21) Appl. No.: 15/859,771

(22) Filed: Jan. 2, 2018

(65) Prior Publication Data
US 2019/0199894 A1 Jun. 27, 2019

(30) Foreign Application Priority Data

Dec. 26, 2017 (CN) .......................... 201711432913.0

(51) Int. Cl.
*H04N 5/225* (2006.01)

(52) U.S. Cl.
CPC ....... *H04N 5/2253* (2013.01); *H04N 5/22521* (2018.08)

(58) Field of Classification Search
CPC .. H05K 1/0201; H05K 7/20509; H05K 7/205; H05K 7/2039; H05K 1/021; H05K 1/0209; H05K 1/0207; H05K 1/0204; H05K 1/0203; H05K 1/0272; B23P 2700/10; G01R 31/2639; G01R 31/2641; H04N 5/374–37457; H04N 5/2251; H04N 5/2252; H04N 5/2257; H01L 27/14643–14663; H01L 27/14618; G02B 13/001–009; G02B 7/04–105; H04M 1/0264
USPC .............. 348/294–324, 372–375; 250/208.1; 257/225–234, 257, 258, 291–294, 257/431–448
See application file for complete search history.

(56) References Cited

U.S. PATENT DOCUMENTS

| | | | | |
|---|---|---|---|---|
| 2001/0052640 A1* | 12/2001 | Sekimoto | .......... | H01L 27/14618 257/678 |
| 2010/0158508 A1* | 6/2010 | Kim | ..................... | H04N 5/2253 396/529 |
| 2011/0298968 A1* | 12/2011 | Tseng | ..................... | G03B 17/12 348/373 |

(Continued)

FOREIGN PATENT DOCUMENTS

| | | |
|---|---|---|
| CN | 202837644 U | 3/2013 |
| TW | M508886 U | 9/2015 |
| TW | 201636720 A | 10/2016 |

*Primary Examiner* — Abdelaaziz Tissire
(74) *Attorney, Agent, or Firm* — ScienBiziP, P.C.

(57) ABSTRACT

A small-scale camera device with heat-dissipating properties includes a pedestal bracket and a camera module mounted on the pedestal bracket. The pedestal bracket includes a top plate and a side plate extending perpendicularly from edges of the top plate. The side plate includes an inner side surface and an outer side surface opposite to the inner side surface. The bottom of the side plate defines a plurality of first receiving recesses, each of the first receiving recesses carries a heat dissipation member.

16 Claims, 4 Drawing Sheets

(56) References Cited

U.S. PATENT DOCUMENTS

| | | | |
|---|---|---|---|
| 2012/0026337 A1* | 2/2012 | Boulanger | G01J 5/046 348/164 |
| 2014/0050469 A1* | 2/2014 | Song | G03B 17/12 396/533 |
| 2015/0028187 A1* | 1/2015 | Jin | H01L 27/14625 250/208.1 |

* cited by examiner

HEAT DISSIPATING ARRANGEMENT FOR MINIATURIZED CAMERA DEVICE

FIELD

The subject matter herein generally relates to camera device, and more particularly, to a heat dissipating arrangement for miniaturized camera device.

BACKGROUND

Since the camera size is miniaturized and has many features, such as the number of pixels being increased, the complexity of circuits for control is increased. When complexity is increased, space between the elements in the circuits is reduced, thus a considerable amount of heat is generated in a camera module. Therefore, the effective dissipation of heat from camera modules is problematic.

BRIEF DESCRIPTION OF THE DRAWINGS

Implementations of the present technology will now be described, by way of example only, with reference to the attached figures.

DETAILED DESCRIPTION

Figure 1:
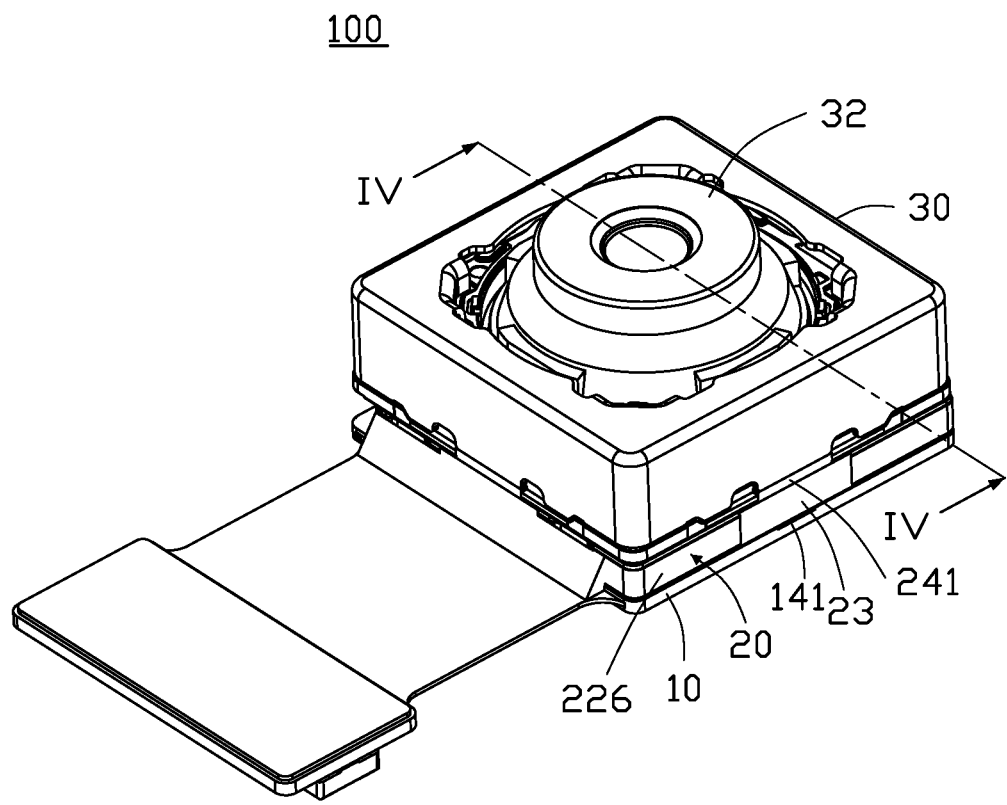
FIG. 1 is a schematic view of a camera device in one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better. The disclosure is illustrated by way of example and not by way of limitation in the figures of the accompanying drawings, in which like references indicate similar elements. It should be noted that references to "an" or "one" embodiment in this disclosure are not necessarily to the same embodiment, and such references mean "at least one."

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The references "a plurality of" and "a number of" mean "at least two."

FIGS. 1~4 illustrate a camera device 100 according to one embodiment. As shown in FIG. 1, the camera module 100 includes a printed circuit board 10, a pedestal bracket 20, and a camera module 30 disposed on the pedestal bracket 20.

Figure 2:
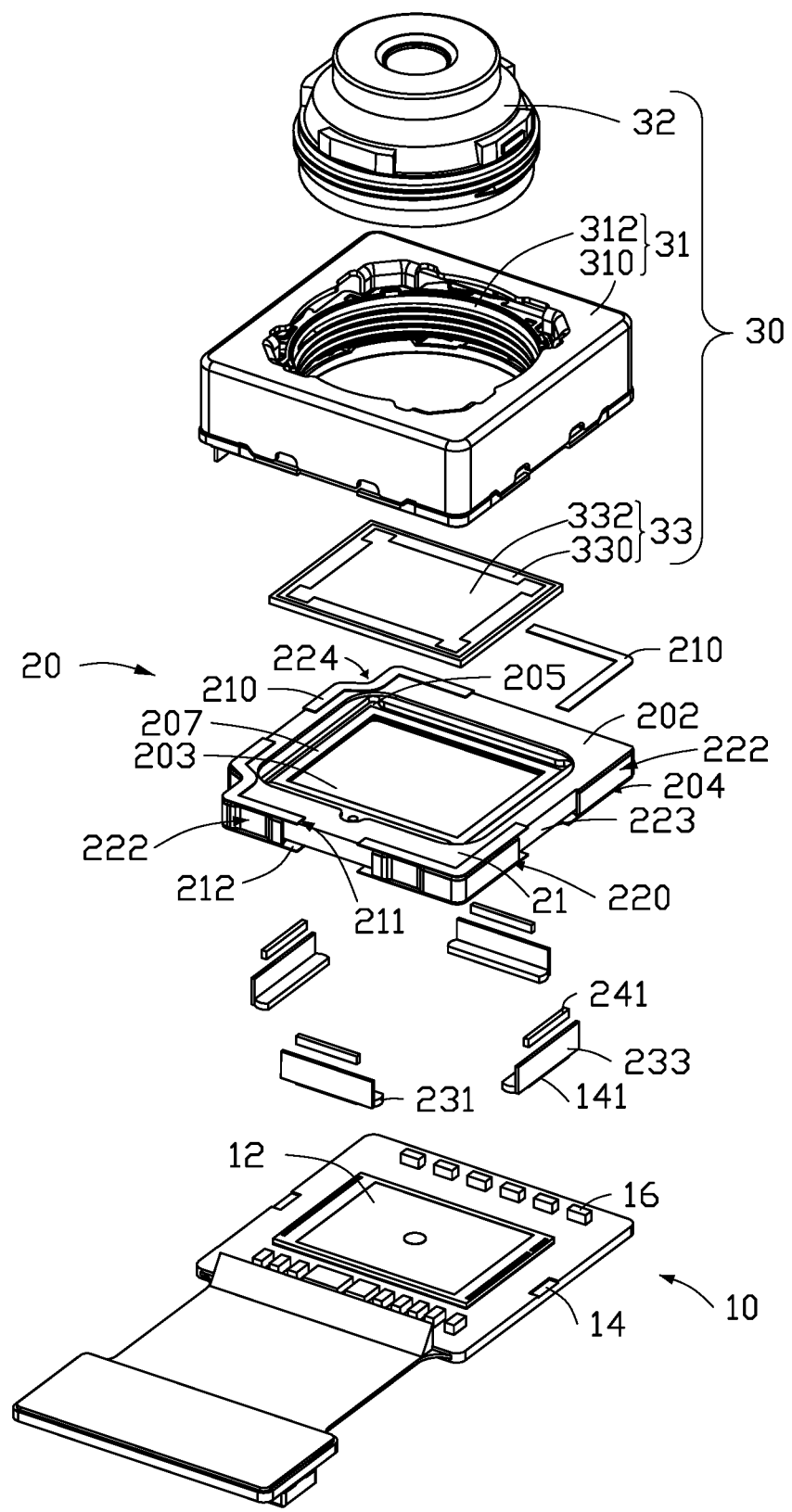
FIG. 2 is an exploded view of the camera module in the device of FIG. 1.
Figure 3:
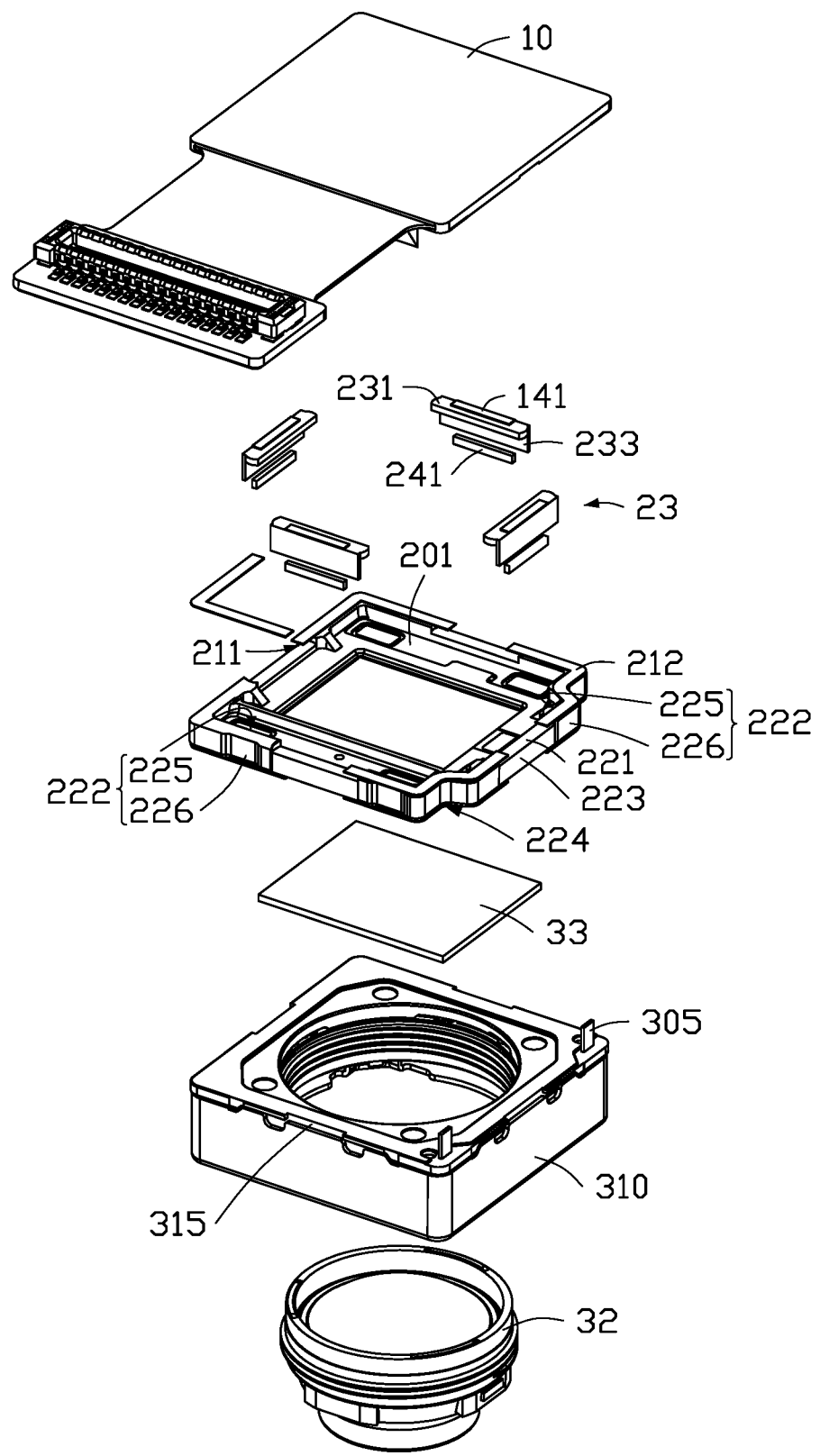
FIG. 3 is another exploded view of the camera module.
Figure 4:
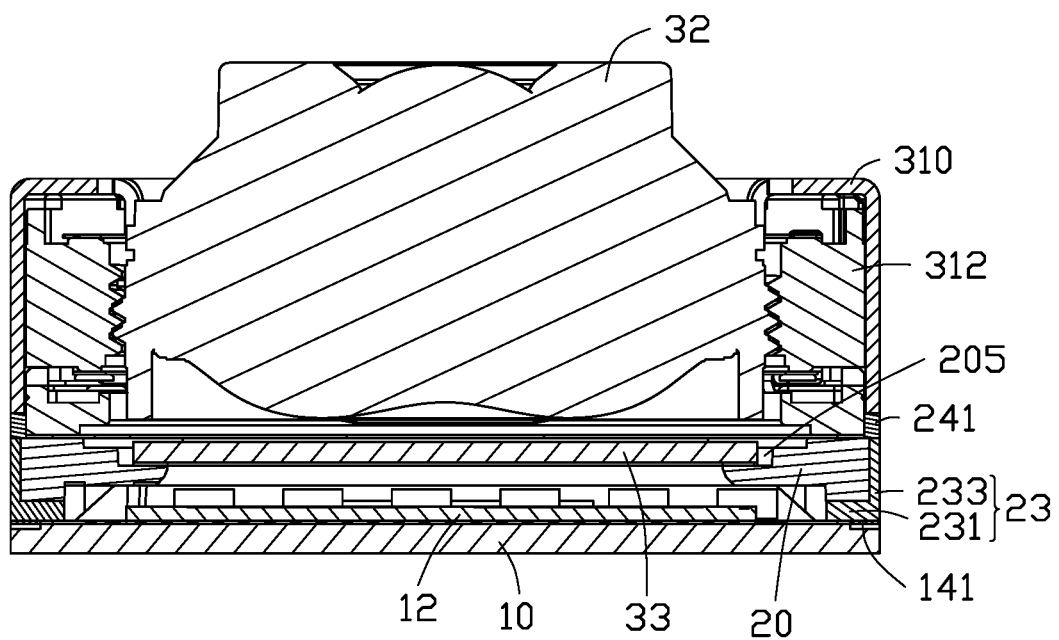
FIG. 4 is a cross-sectional view of the camera module.

The printed circuit board 10 is a flexible printed circuit board, a rigid-flexible printed circuit board, or a ceramic substrate. As shown in FIGS. 2~3, the printed circuit board 10 carries an imaging sensor chip 12, at least one grounding pad 14 surrounding the imaging sensor chip 12, and a plurality of electronic components 16 on opposite sides of the imaging sensor chip 12.

The imaging sensor chip 12 is electrically connected with the printed circuit board 10. The printed circuit board 10 is substantially a tetragonum, and the number of grounding pads 14 is two, arranged at opposite edges of the printed circuit board 10. The electronic components 16 work to improve performance of the imaging sensor chip 12, for example, the electronic components 16 can be resistors and capacitors.

The pedestal bracket 20 is disposed on the printed circuit board 10. The pedestal bracket 20 can be around shape or a tetragonum shape. In this embodiment, the pedestal bracket 20 is a tetragonum shape and includes a top plate 21 and four lateral ribs 222 extending perpendicularly from edges of the top plate 21. The four lateral ribs 222 perpendicularly connect with each other. The top plate 21 and four lateral ribs 222 together define a receiving space 201, the receiving space 201 is configured to accommodate the imaging sensor chip 12 and the electronic components 16.

Each lateral rib 222 comprises an inner side surface 225 and an outer side surface 226. A first receiving recess 221 passes through the inner side surface 225 and outer side surface 226. The heat dissipation member 23 is configured to receive a heat dissipating member 23. The heat dissipation member 23 is substantially a plate.

One of the lateral ribs 222 is bent and includes two hollow portions 224 at the corner therebetween. The hollow portion 224 is configured for accommodating conductive terminals 305 of the camera module 30. A bottom 220 of each lateral rib 222 has a first receiving recess 221, and each first receiving recess 221 is arranged to face each grounding pad 14.

In the embodiment, the heat dissipating member 23 is made from metal, especially a metal with high thermal conductivity, such as copper, aluminum, or the like. The heat dissipating member 23 is formed in the first receiving recess 221 of the pedestal bracket 20 by an insert molding method. When heat generated by the printed circuit board 10 and the imaging sensor chip 12 builds up in the receiving space 201, the heat reaches the heat dissipation member 23, and the heat dissipating member 23 quickly discharges heat to exterior of the receiving space 201.

In order to improve cooling effect, the heat dissipation member 23 is substantially L-shaped and comprises a first block 231 and a second block 233 perpendicular to the first block 231. The outer side surface of each lateral rib 222 defines a second receiving recess 223 connecting with each first receiving recess 221. The first block 231 is embedded in the first receiving recess 221 and the second block 233 is embedded in the second receiving recess 223. Top end of the second block 233 is aligned with the top plate 21. The first block 231 is arranged towards the grounding pad 14 and a first conducting adhesive 141 is sandwiched between each grounding pad 14 and each first block 231.

The pedestal bracket 20 further includes an aperture (light through hole 203) passing through the top plate 21 and a step portion 205 surrounding the light through hole 203. The step portion 205 carries a layer of black adhesive 207.

The camera module 30 includes a voice coil motor 31, a lens module 32, and an infrared filter 33 (IR-cut). The voice coil motor 31 includes a metal shell 310, a coil (not shown) arranged in the metal shell 310, a magnet (not shown) arranged in the metal shell 310, and a lens group 32 received in the metal shell 310.

The IR-cut filter 33 removes wavelengths in a near infrared range. The IR-cut filter 33 is fixed on the step portion 205 via the fixing adhesive 207 and exposes part of the black adhesive 207. The IR-cut filter 33 includes a light permeable area 332 and a light shielding area 330 surrounding the light permeable area 332. The light shielding area 330 is formed by black adhesive or black ink to absorb stray light. The exposed portion of the black adhesive 207 attracts and accumulates dust and other small particles.

The pedestal bracket 20 includes a first surface 202 facing the metal shell 310 and a second surface 204 opposite to the first surface 202. The camera module 30 is fixed on the first surface 202 via a first fixing adhesive 210, the pedestal bracket 20 is fixed on the printed circuit board 10 via a second fixing adhesive 212.

The first fixing adhesive 210 is formed on the edge of the first surface 202, and the second fixing adhesive 212 is formed on edge of the second surface 204 or the printed circuit board 10. Both the first fixing adhesive 210 and the second fixing adhesive 212 include a number of openings 211. The top surface of the second block 233 has a second conductive adhesive 241. Each opening 212 of the first fixing adhesive 210 exposes part of the second conductive adhesive 241. Each opening 211 of the second fixing adhesive 212 exposes part of the first conductive adhesive 141. In the illustrated embodiment, the metal shell 310 includes a plurality of cutouts 315 corresponding to each second conductive adhesive 241. The cutout 315 is configured to receive part of the second conductive adhesive 241.

When the camera module 30 is disposed on the pedestal bracket 20, the metal shell 310 conductively contacts the second block 233 via the second conductive adhesive 241. The second block 233 is part of the heat dissipation member 23, and the heat dissipation member 23 contacts the grounding pad 14 via the first conductive adhesive 141, that is, the metal shell 30 is indirectly in electrical contact with the grounding pad 14. In this way, the metal shell 310 is connected to ground, and thus the first conductive adhesive 141, the heat dissipation member 23 and the second conductive adhesive 241 together shield against electromagnetic interference (EMI), and also electro static discharge (ESD).

The embodiments shown and described above are only examples. Therefore, many commonly-known features and details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A camera device, comprising:
    a printed circuit board;
    a pedestal bracket mounted on the printed circuit board, and a camera module mounted on the pedestal bracket; the camera device further comprises an imaging sensor chip mounted on the printed circuit board; the pedestal bracket comprises a receiving space; and the imaging sensor chip is accommodated in the receiving space; wherein the pedestal bracket comprises four lateral ribs perpendicularly connecting with each other, each of the four lateral ribs is defined with a first receiving recess, each first receiving recess is arranged with a heat dissipation member, each heat dissipation member comprises two opposite surfaces, one surface is exposed in the receiving space, the other surface is exposed outside of the pedestal bracket.

2. The camera device of claim 1, wherein the pedestal bracket is round or a tetragonum shape, and the heat dissipation member is a plate.

3. The camera device of claim 2, wherein the pedestal bracket is a tetragonum shape and further comprises a top plate connecting with each of the four lateral ribs.

4. The camera device of claim 3, wherein one of the lateral ribs is a bending shape, and comprises two hollow portions at the corner therebetween.

5. The camera device of claim 3, wherein the camera module further comprises an IR-cut filter, the pedestal bracket further comprises a light through hole penetrating through the top plate and a step portion surrounding the light through hole, the IR-cut filter is disposed on the step portion.

6. The camera device of claim 5, wherein the IR-cut filter comprises a light permeable area and a light shielding area surrounding the light permeable area, the light shielding area is formed with a black adhesive or black ink.

7. The camera device of claim 1, wherein the heat dissipating member is a block, and made from metal and formed with the pedestal bracket using an insert molding method.

8. The camera device of claim 1, wherein outer side surface of each of the four lateral ribs defines a second receiving recess connecting with a corresponding one of the first receiving recesses.

9. The camera device of claim 8, wherein the heat dissipation member is substantially L-shaped and comprises a first block and a second block perpendicularly to the first block, the first block is received in the first receiving recess and the second block is received in the second receiving recess.

10. The camera device of claim 9, wherein the printed circuit board comprises at least one grounding pad, and a location of the at least one grounding pad corresponds to each of the heat dissipation member.

11. The camera device of claim 10, wherein the pedestal bracket further comprises a first conductive adhesive, and the first conductive adhesive is sandwiched between the at least one grounding pad and the first block.

12. The camera device of claim 10, wherein the camera module mounted on the pedestal bracket via a first fixing adhesive, and the pedestal bracket mounted on the printed board via a second fixing adhesive.

13. The camera device of claim 12, wherein the camera device further comprises a second conductive adhesive, the camera module comprises a metal shell, and the second conductive adhesive is sandwiched between the second block and bottom of the metal shell.

14. The camera device of claim 13, wherein the camera module comprises a voice coil motor, the voice coil motor comprises the metal shell and a lens module received in the metal shell.

15. The camera device of claim 1, wherein the camera device further comprises a plurality of electronic components, and the electronic components are mounted on the printed circuit board and located on both sides of the imaging sensor chip.

16. A camera device, comprising:
- a printed circuit board comprising at least one grounding pad formed opposite edges thereon;
- a pedestal bracket being mounted on the printed circuit board; wherein the pedestal bracket comprises a top plate and four lateral ribs extending perpendicularly from edges of the top plate, the side plate defines a receiving first recess thereon, each first receiving recess is arranged with a metal member, a location of the metal member is aligned with the at least one grounding pad;
- a camera module mounted on the pedestal bracket; wherein the camera module comprises a metal shell; and
- a first conductive adhesive and a second conductive adhesive, wherein the first conductive adhesive is formed on the top plate and contacted with top end of the metal member, and the second conductive adhesive is formed on the at least one grounding pad, and the metal shell is electrically connected to the at least one grounding pad via the first conductive adhesive, the metal member, and the second conductive adhesive.

* * * * *